3,793,244
WATER-RETAINING LATEXES OF STYRENE-BUTADIENE-ITACONIC ACID TERPOLYMERS

James Francis Megee, 5 Redwood Road, Acton, Mass. 01720, and Richard Gorham Nickerson, 1 Colonial Way, Weston, Mass. 02193
No Drawing. Filed Aug. 17, 1972, Ser. No. 281,309
Int. Cl. C08d 1/09, 3/02; C08f 15/40; C09d 11/10
U.S. Cl. 260—29.7 H       4 Claims

ABSTRACT OF THE DISCLOSURE

A latex of styrene-butadiene-itaconic acid is made to be water-retaining by interpolymerizing while supplying all the butadiene gradually to an aqueous phase containing all the styrene and itaconic acid from the start, in the presence of surfactant in amount of at least 5%, based on weight of total terpolymer. Pigmented paper-coating slips have excellent machinability when prepared with a binder consisting essentially of this latex.

BACKGROUND OF THE INVENTION

Printable coatings for paper, paperboard and other fibrous webs are generally made by applying to the web various suspensions of pigmentary material comprising clay and the like, dispersed with polymeric adhesive material. The pigmentary material fills the spaces between the surface fibers and provides a smooth surface for printing. The polymeric adhesive serves to bind the pigment particles to each other and to the fibers and the nature of the polymeric material largely determines the degree to which the various desirable properties of the coating are obtained.

Among the synthetic materials which have become prominent for use as pigment binders are emulsion polymers or latexes derived from the monomers styrene and butadiene with or without small amounts of various ethylenically unsaturated copolymerizable carboxylic acids; "coating slips" prepared by formulating such latexes with pigments are capable of depositing printable coatings on paper which have good pick resistance and ink holdout during printing.

However, when the styrene-butadiene polymers of the prior art are used as the sole binding agent in such coating slips, it is very difficult to obtain uniformly smooth coatings on commercial machinery. This has been attributed at least in part to an insufficient ability of the styrene-butadiene particles to retain water and thus to provide an even distribution of the slip over the paper web as the latter moves rapidly past the locus of application in the coating machine.

Such deficiently performing coating compositions or slips are said to "machine poorly." When, for example, a trailing-blade coater is used, the slip may dehydrate so rapidly that small semi-coagulated lumps collect at the site of the metering blade and cause unsightly scratches to form on the coating surface. While conditions are somewhat less critical when an airknife is used, the slip viscosity may be too low to prevent streaking and mottling at desirable high speeds of translating the web through the machine.

The approach commonly taken to correct for the poor machinability of slips based solely on styrene-butadiene latexes has been to return in part to an earlier practice of using natural polymers such as casein, soy-bean protein or starch. The use of mixtures of such natural polymers with styrene-butadiene latexes has proved to be a compromise at best. Although the natural adhesives possess an inherent ability to hold water, they also tend to raise the slip viscosity to undesirably high levels. Also, their use entails additional operational steps, inasmuch as they must first be solubilized separately before being added to the coating slip. This solubilization must be carried out in relatively small batches in order to avoid storage over extended periods because they are susceptible to attack by microorganisms. Furthermore, casein and soy protein are relatively expensive.

SUMMARY OF THE INVENTION

A method has now been found for preparing a latex of a styrene-butadiene-itaconic acid terpolymer which can be used as the sole binding agent for pigmentary material in the formulation of papercoating "slips" which are easily applied on a large variety of coating machines to produce smooth and uniform coatings with desirable printability characteristics.

The latex of this invention has as its dispersed phase a terpolymer containing polymerized therein, per 100 parts by weight of terpolymer, 46–63 parts styrene, 27–42 parts butadiene and 7–17 parts itaconic acid. To gain the advantages of this invention, said latex must be made in the presence of a surfactant in amount corresponding to at least 5% of the weight of said terpolymer, and all of the butadiene must be withheld from the aqueous polymerization phase until all of the styrene and itaconic acid are dispersed in the water containing said surfactant and a free-radical initiating system. Then while causing interpolymerization to take place, the butadiene, is supplied to the closed reactor at a rate such as to maintain a butadiene partial pressure at a level between 30 and 50 p.s.i., and interpolymerization is continued until all the monomer is substantially converted to polymer.

In summary, the instant invention relates to a coating composition for providing a printable coating on a fibrous web, which composition comprises (a) a finely divided pigmentary material having a predominant proportion of clay and (b) a binder consisting essentially of the solids of a teropolymer latex prepared by emulsion polymerization in an aqueous medium and containing interpolymerized therein per 100 parts by weight of terpolymer, 46–63 parts styrene, 27–42 parts butadiene and 7–17 parts itaconic acid, said polymerization being carried out (i) in the presence of an anionic or nonionic surfactant in an amount corresponding to at least about 5% of the weight of said terpolymer and further restricted by the conditions that (ii) all of said styrene and all of said itaconic acid are dispersed in said aqueous medium before causing interpolymerization to take place and that (iii) the interpolymerization is then caused to take place while the butadiene is added gradually to said aqueous medium at a rate such as to maintain the partial pressure of butadiene at between 30 and 50 p.s.i. until said interpolymerization is substantially complete.

This invention includes the method of making the latex and also the latex thereby produced.

This invention includes also an improved method for providing a printable coating on a fibrous web which method comprises the use of said coating composition, thereby achieving the advantages of high retention of water by the coating with resultant substantially improved uniformity and smoothness of coating.

According to a modification of the instant invention, up to about 50% of the butadiene can be added initially with the styrene and itaconic acid before causing interpolymerization to take place, whereby a water retention is obtained which is still superior to that obtainable with latexes of the prior art. However, for optimum improvement in water retention, it is preferred to add all of the butadiene gradually.

DETAILED DESCRIPTION OF THE INVENTION

The latex used in making the coating slips of this invention is prepared by the emulsion interpolymerization of the styrene, butadiene and itaconic acid using a procedure illustrated in Example 1 below.

The water used in preparing the aqueous composition for this polymerization is in amount aimed to provide a final solids content of about 40–60%.

The pH of the aqueous composition should be adjusted to a value of 3 or lower since at higher pH the anionic itaconate is present in amounts large enough to inhibit polymerization and/or prevent the itaconic moiety from being suitably copolymerized. In general the pH of the aqueous composition can be that determined by the particular concentration of itaconic acid used. This amount can be in quantity corresponding to form 7 to 17 parts by weight of terpolymer, the preferred amount being about 9–13% on weight of terpolymer.

The styrene and butadiene are copolymerized in amounts corresponding to a weight ratio between 45/55 and 68/32, preferably between 50/50 and 65/35.

In order to gain the high water retention benefits of this invention, the aqueous composition must contain at least 5%, based on terpolymer weight, of a surfactant. The surfactant can be selected from any of the anionic and nonionic surfactants commonly used in the emulsion polymerization of styrene-butadiene systems. Particularly suitable anionic surfactants include sodium dodecyl benzene sulfonate and sodium dihexyl sulfosuccinate. Particularly suitable nonionic surfactants are the adducts of nonyl phenols with from 9 to 15 mols of ethylene oxide such as those commercially known under the proprietary name Igepal. A particularly preferred surfactant system is a combination of 1.0–3.0% sodium dodecyl benzene sulfonate and 2.0–5.0% of said nonyl phenol/ethylene oxide adduct, the percentages being based on finished terpolymer weight. If substantially less than 5% total surfactant is used, the high water retention benefits of the instant invention are not obtained, as illustrated in Example 5 below. The level of at least 5% surfactant, based on terpolymer weight, must be maintained from the start of the emulsion polymerization. If the emulsion polymerization is carried out with less than 5% surfactant, leading to a product providing unacceptable low water retention, a desirable water retention value cannot be gained by mere post-addition of an amount of surfactant sufficient to bring the total amount of surfactant in the composition above 5%.

The initiating system used to effect the emulsion polymerization can be any of the customary water-soluble free-radical donating systems including those which are activated by heat and those which are activated by reducing agents. Thus when a thermally activated system is used, the free-radical donor can, exemplarily, be an alkali metal persulfate or peroxydiphosphate and when a redox system is used, the reducing agent used in conjunction with such free-radical donor can exemplarily be an alkali metal metabisulfate or formaldehyde sulfoxylate, or ascorbic or erythorbic acid.

The temperature at which the copolymerization is carried out can be in range of 50–100° C. The preferred system uses potassium persulfate as initiator and carries out the main 8–12 hour period of the polymerization at 53–57° C., during which butadiene is gradually added; followed by a 2.5–3.5 hour period at about 60° C. and a "finishing-off" period of 4 hours at about 85–90° C.

An essential requirement in carrying out the emulsion copolymerization of the latex used in the instant invention is that at least one half and preferably all of the butadiene must be added incrementally to the aqueous copolymerizing system at a rate such as to maintain the partial pressure of butadiene at 30–50 p.s.i. This incremental addition can be made either continuously or in small portions, such as exemplarily portions amounting to not more than about 1 to 2% of the total amount, added substantially equally spaced in time over the total time of addition. This overall time of addition should be no shorter than about 4 hours. Times greater than about 16 hours become impractical. In practice, it is preferable to have an addition time of about 8–12 hours.

In the preparation of the coating slips of this invention, the conventional finely divided pigmentary materials are used. This materials are predominantly mineral in character but can be partly organic. As is customary in the practice of printable coatings for paper and paperboard, the predominant portion, at least 50%, of the pigment consists of clays, particularly of the kaolin type. Materials which can be used together with the clay include calcium carbonate, titanium dioxide, talc, blanc fixe and the like. The pigment or pigment mixture is preferably first dispersed in water, using a small amount of sodium hexametaphosphate or tetrasodium pyrophosphate or the like as a dispersing aid. Normally a pH adjustment to a value of from about 6 to about 9 is made before mixing with the latex. Such adjustment may not be necessary if the amount of dispersing agent is fortuitously appropriate also to obtaining the desired pH. If a pH adjustment is desired, however, both before and after addition of the latex, this may be accomplished with alkalizing agents such as sodium hydroxide, potassium hydroxide, ammonium hydroxide and the like.

The coating slips of the instant invention consist substantially of the pigmentary material and the particular latex of this invention. Outside of small amounts of dispersing aids and the like, the slips do not contain significant amounts of other additives; in particular, polymers like casein, soy-bean protein, starch and the like are substantially absent. The ratio of latex solids to pigment can be varied over a considerable range, say from 5 to 30 parts by weight of latex solids per 100 parts of pigment, dry basis, in the aqueous mixture. However, in order to obtain the best benefits of this invention, it is preferred that this ratio be between about 12 and 20 parts latex solids per 100 parts pigment, most suitably 14–18 parts.

The total solids content of the coating slips can vary over the usual range of prior art coating practices, namely from about 8 percent to about 65%, and depends largely on the coating equipment used. For use on a trailing blade coater, slips with a solids content in the range of about 55–65% are preferred.

The coating slips can be applied to the paper or paper board by conventional means such as letterpress print roll coater, offset roll coater, size press, air knife and blade coater.

The coated paper is dried by any convenient method, preferably by a current of air at a velocity of up to about 10,000 feet per minute. The temperature of the air can vary up to 600° F. but the duration of contact between heated air and coating is such that the coating is not heated above 250° F.

Paper coated with the coating slips of this invention have been found to have excellent dry pick resistance as measured by the standard IGT test well known in the art, also good wet pick resistance, wet rub resistance, K & N ink holdout, and high brightness, using standard tests accepted by the paper trade.

TEST FOR WATER RETENTION

Water retention of paper coating slips was measured using the S. D. Warren Co. instrument described by Stinchfield, Clift and Thomas in TAPPI, 41 No. 2, 77 (1958). In the experience of the present inventors, the values obtained in this test correlate significantly with "machineability." Thus, for example, a coating slip at pH 9 having a water retention value of 50 or greater performs excellently on a trailing blade coater with lower than normal frequency of necessity to clean the metering blade and with negligble production of second-grade material having scratches. Likewise with air knife coating, high grade coated paperboard has been obtained at high coating speeds of up to 2500 ft./min.

The instrument consists of a steel plate and a steel plane-surfaced weight resting thereon, which are connected through an ammeter with constant voltage alternating current. When plate and weight are in direct contact with each other, the meter shows a full scale deflection of 1 milliampere. When paper is inserted between plate and weight, no current flows and the meter reads zero. About 5–10 ml. of coating slip is placed on the plate, sufficient to provide film under the entire area of the weight. Standard test paper is placed on top of the slip and, as the weight is quickly placed on top of the paper, a timer is simultaneously started. The timer is stopped when the current flowing through the paper reaches 0.5 milliampere. The time in seconds is taken as an arbitrary measure of the water retention.

In the tests reported in this patent application, the standard paper used throughout was Baroid Filter Paper No. 988, a high density paper having 2.5 inch diameter, supplied by National Lead Co. for use in pressure filtration. The use of such a high density paper has the advantage of increasing the time necessary to reach 0.5 ampere, thus increasing the sensitivity of the test. Each value for water retention reported herein is the average of at least 5 measurements which agree within ±1 second.

The invention will be further illustrated by description in connection with the following specific examples of the practice of it. In these examples and elsewhere herein proportions are expressed as parts by weight except when specifically stated to the contrary.

EXAMPLE 1

A latex for use in preparing coating slips in accordance with this invention was prepared in the following manner. 14,300 grams of deionized water was charged to a 10-gallon reactor. There was then added successively 1634 grams itaconic acid and 102 grams potassium persulfate, mixing until dissolved, followed by 730 grams of a 37% by weight aqueous solution of sodium dodecyl benzene sulfonate, 272 grams of an ethylene oxide adduct of nonyl phenol (Igepal CO–630) and 48 grams of tertiary dodecyl mercaptan. The homogeneous dispersion, which had a pH of 2.5, was then heated to 30° C. with agitation. 6804 grams of styrene was charged and agitation was continued for five minutes. The reactor was sealed and a vacuum was applied to remove oxygen which inhibits the polymerization. The temperature of the mixture was then raised to 55° C. and maintained at 55° C. while gradually adding 6804 grams of butadiene continuously at a constant rate over a period of 12 hours. Over this period the partial pressure of butadiene was maintained at 30–50 p.s.i. At the completion of butadiene feed, the temperature of the reaction mixture was raised to 60° C. and held there for 3 hours. The batch was then heated to 85–90° C. and held there for 4 additional hours.

The resultant latex was cooled to room temperature and found to contain 50.3% solids. The latex was substantially free of coagulum, only 0.013 gram of grit being retained on the passage of 400 grams of latex through a 200 mesh screen. The viscosity was 280 cps. using Brookfield viscometer with No. 2 spindle at 60 r.p.m. Surface tension was 36.1 dynes/centimeter. The latex was extremely stable to shear, withstanding at least 30 minutes mixing in a laboratory Hamilton Beach blender without formation of coagulum. The latex has been stable to storage for at least a year.

EXAMPLE 2

A series of latexes (2a–2e) was prepared using the same overall composition as in Example 1. In each run all the components except the butadiene were emulsified in the aqueous phase before commencing polymerization. In run (a) all the butadiene also was added at the beginning and a typical "batch" polymerization was carried out over a period of 12 hours, followed by a 4-hour "finishing-off" at 85–90° C. The remaining runs of this example differed in that various fractions of the butadiene were withheld from a first "batch" polymerization stage which extended over a period of 8 or 12 hours as stated; the withheld butadiene was then fed gradually over a period of 2, 3 or 4 hours, as stated. In each case there was a final "finishing-off" at 85–90° C.

The latexes of Examples 1 and 2 were used to make coating slips at 60% solids, the weight ratio of the solids being 100 parts Huber Hydrofine clay to 16 parts latex solids. Two sets of slips were prepared, one at pH 6.0, the other at 9.0, the adjustments of pH being made by addition of sufficient ammonia. Water retention tests were made on the slips. The results are summarized in the following table:

| | Mode of butadiene addition | | | | | |
|---|---|---|---|---|---|---|
| | First "batch" stage | | Gradual addition | | | |
| Example | Proportion butadiene, percent | Hours | Proportion butadiene, percent | Hours | Water retention in seconds at— | |
| | | | | | pH 6.0 | pH 9.0 |
| 2a | 100 | 12 | 0 | 0 | 16.1 | 24.7 |
| 2b | 80 | 12 | 20 | 2 | 13.2 | 20.2 |
| 2c | 67 | 12 | 33 | 3 | 14.6 | 26.6 |
| 2d | 67 | 8 | 33 | 4 | 17.2 | 31.3 |
| 2e | 50 | 12 | 50 | 3 | 27.4 | 53.0 |
| 1 | 0 | 0 | 100 | 12 | 35.2 | 57.9 |

These data show that when 50% of the butadiene was withheld from the original "batch" stage, the water-retention was substantially improved and that when all the butadiene was thus withheld and added gradually the water-retention reached a maximum of more than twice the retention obtainable when all the components including butadiene were reacted in "batch" form.

EXAMPLE 3

Proceeding as in Example 1, a latex was prepared of an interpolymer containing 65 parts by weight of styrene, 35 parts butadiene and 12 parts of itaconic acid. The surfactant system consisted of 2 parts sodium dodecyl benzene sulfonate and 4.5 parts Igepal CO–710 ethylene oxide adduct of nonyl phenol. The total amount of butadiene was added to the aqueous composition gradually over a period of 12 hours at a substantially constant rate. The pH was adjusted to 5.3 with aqueous ammonia. The resultant latex had 50.0% solids and negligible grits, a surface tension of 35.2 dynes/centimeter and a pH equal to 5.3. A coating slip was prepared from this latex containing 100 parts hydrofine clay to 16 parts latex solids. The coating slip had a total solids content equal to 60%. Water retention tests made on this slip at pH 9.0 averaged 53 seconds. This example illustrates the instant invention in using a level of itaconic acid higher than 7 parts by weight based on terpolymer and in using a surfactant level greater than 5% based on terpolymer; as well as in adding all the butadiene gradually.

EXAMPLE 4

This examples is not an illustration of the instant invention, but shows that the benefits of the instant invention are not obtained if a major part of the styrene as well as the butadiene is added gradually during the emulsion polymerization of the latex.

27.5 lbs. of deionized water was charged to a reactor There was then added successively 136 grams of potassium persulfate, 163 grams of 75% aqueous solution of Aerosol OT brand of dioctyl ester of sodium sulfosuccinic acid, 68 grams of 30% aqueous Duponol WAQE brand of sodium lauryl sulfate, 136 grams carbon tetrachloride, 409 grams of itaconic acid and 136 grams of acrylic acid. The reactor was sealed and purged twice with nitrogen. A mixture of 3.2 lbs. of styrene with 2.6 lbs. of butadiene, premixed in a bomb, was then added to the reactor and the dispersion agitated for about 15 minutes without increasing the temperature over 30° C. The dispersion was then heated to about 75° C. When the temperature reached about 50° C. during the heat-up period, there was commenced a continuous addition of a feed containing 12.6 lbs. styrene and 10.4 lbs. butadiene, premixed in a bomb. The continuous addition of the styrene-butadiene mixture was extended over 6 hours, at a rate of 3.8 lbs. per hour. After all of the monomers had been added, a solution of 385 grams of 30% aqueous Duponol WAQE in 1.3 lbs. of deionized water was charged. Polymerization was continued at about 75° C. for an additional 6 hours. The batch was then cooled and vented. The finished latex was free of coagulum and contained about 50% solids.

A coating slip was prepared similar to those described in Example 2 except that the latex of this present Example 4 was used. The weight ratio of latex solids to clay solids was 16% and the coating slip had 60% total solids. Water retention measured on this slip averaged only 8.0 at pH 9.0, showing that gradual addition of styrene during the preparation of the latex resulted in a corresponding clay slip which was deficient in water retention.

EXAMPLE 5

The procedure and composition of Example 3 was followed except that the surfactant system was reduced to only 0.75 part sodium dodecyl benzene sulfonate and 1.55 parts Igepal CO-710. The resultant latex had 50.3% solids and negligible grits, a surface tension equal to 38.7 dynes/centimeter and the pH was 6.0. A corresponding 60% solids slip (with Hydrofine clay/latex solids equal to 100/16) showed an average water retention at pH 9.0 of only 10 seconds. This example is not an illustration of the instant invention but shows that when the surfactant level used was less than 5% of the weight of the terpolymer, the benefits of the invention were not obtained.

EXAMPLE 6

A latex was prepared using the procedure of Example 1 and the composition of Example 3 except that the 12 parts of itaconic acid were replaced by only 6 parts. The pH of the resultant latex was adjusted to 5.9. Solids were 50.2%. There were negligible grits. The surface tension was 32.6 dynes/centimeter.

A 60% solids slip made from this latex and containing 100 parts Hydrofine clay to 16 parts latex solids showed an average water retention at pH 9.0 of only 21.0 seconds. This example is not an illustration of the instant invention in that it used less than 7 parts of itaconic acid per 100 parts of terpolymer.

EXAMPLE 7

A latex was prepared by a procedure similar to that of Example 1 with a styrene-butadiene weight ratio equal to 50/50 and with itaconic acid in the amount corresponding to 10.7% of total monomer. A coating slip was prepared at pH 9 having 60% total solids and a weight ratio of latex solids to Huber Hydrofine clay equal to 16/100. The average water retention value obtained with this slip was 55.1.

EXAMPLE 8

A series of three latexes is prepared as in Example 7 except that the amount of itaconic acid used is respectively 12%, 14% and 17% based on weight of total monomer. Coating slips at pH 9 are prepared as in Example 7 and in each case water retention values higher than 50 are obtained.

EXAMPLE 9

A series of latexes is prepared using the procedure of Example 1 except that the weight ratio of the styrene to the butadiene used in successive prepartions is, respectively, 55/45, 51/49, 58/42, 63/37 and 68/32. In each case a slip prepared according to the porcedure used in Example 2 has excellent water retention.

When slips are prepared from these latexes with the ratio of latex solids to clay solids being respectively, 5/100, 10/100, 15/100, 20/100, 25/100 and 30/100, in each case a water retention is obtained which is substantially superior to that which is obtained when the latex of Example 4 is used instead.

It is to be understood that it is intended to cover all changes and modifications of the examples of the invention herein chosen for the purpose of illustration which do not constitute departures from the spirit and scope of the invention.

What is claimed is:

1. In a composition for providing a printable coating on a fibrous web, which composition comprises (a) a finely divided pigmentary material having a predominant proportion of clay and (b) a binder consisting essentially of the solids of a terpolymer latex prepared by emulsion polymerization in an aqueous medium under pressure and containing interpolymerized therein per 100 parts by weight of terpolymer, 46–63 parts styrene, 27–42 parts butadiene and 7–17 parts itaconic acid, an improvement wherein the latex used for said binder is polymerized (i) in the presence of no less than about 5% of an anionic or nonionic surfactant, based on the weight of said terpolymer, all of said surfactant being present from the start of emulsion polymerization, and with the further restrictions that (ii) all of said styrene and all of said itaconic acid are dispersed in said aqueous medium before causing interpolymerization to take place and that (iii) the interpolymerization is then caused to take place while the butadiene is added gradually to said aqueous medium at a rate such as to maintain the partial pressure of butadiene at between 30 and 50 p.s.i. until said interpolymerization is substantially complete.

2. In a method of preparing a terpolymer latex by emulsion polymerization of styrene, butadiene and itaconic acid monomers under pressure in an aqueous medium containing an anionic or nonionic surfactant, the amounts of said monomers per 100 parts by weight of terpolymer being 46–63 parts styrene, 27–42 parts butadiene and 7–17 parts itaconic acid, an improvement which comprises
(i) limiting the amount of said surfactant to not less than about 5%, based on terpolymer weight, all of said surfactant being present from the start of emulsion polymerization,
(ii) dispersing all of said styrene and all of said itaconic acid in said aqueous medium before causing interpolymerization to take place, and
(iii) causing interpolymerization to take place while adding said butadiene gradually to said medium at a rate such as to maintain the partial pressure of butadiene at between 30 and 50 p.s.i. until said interpolymerization is substantially complete.

3. In a method of providing a printable coating on a fibrous web by applying an aqueous composition comprising a finely divided pigmentary material having a predominant proportion of clay and a binder consisting essentially of the solids of a terpolymer latex prepared by aqueous emulsion polymerization under pressure of 46–63 parts by weight styrene, 27–42 parts butadiene and 7–17 parts itaconic acid per 100 parts terpolymer in the presence of an anionic or nonionic surfactant.

an improvement which comprises using as said terpolymer latex the latex produced by a method using the improvement of claim 2.

4. In a method of providing a printable coating on a fibrous web by applying an aqueous composition comprising a finely divided pigmentary material having a predominant proportion of clay and a binder consisting essentially of the solids of a terpolymer latex prepared by aqueous emulsion polymerization under pressure of 46–63 parts by weight styrene, 27–42 parts butadiene and 7–17 parts itaconic acid per 100 parts terpolymer in the presence of an anionic or nonionic surfactant, an improvement which comprises using as said terpolymer latex a latex polymerized (i) in the presence of no less than about 5% of an anionic or nonionic surfactant, based on the weight of said terpolymer, all of said surfactant being present from the start of emulsion polymerization, and with the further restrictions that (ii) all of said styrene and all of said itaconic acid and not more than half of the butadiene are dispersed in said aqueous medium before causing interpolymerization to take place and that (iii) the interpolymerization is then caused to take place while the remainder of the butadiene is added gradually to said aqueous medium at a rate such as to maintain the partial pressure of butadiene at between 30 and 50 p.s.i. until said interpolymerization is substantially complete.

References Cited

UNITED STATES PATENTS

| 3,274,141 | 9/1966 | Pieper et al. | 260—29.7 |
| 3,472,808 | 10/1969 | Isgur et al. | 260—29.7 |

FOREIGN PATENTS

| 1,072,694 | 6/1967 | Great Britain. |
| 740,498 | 8/1966 | Canada. |

OTHER REFERENCES

India Rubber World (April 1944), p. 79.

LEWIS T. JACOBS, Primary Examiner

T. DE BENEDICTIS, SR., Assistant Examiner

U.S. Cl. X.R.

260—29.7 T, 78.5 BB, 78.5 R, 80 M, 80.7, 82.1, 83.7, 94.2 R

UNITED STATES PATENT OFFICE
CERTIFICATE OF CORRECTION

Patent No. 3,793,244     Dated February 19, 1974

Inventor(s) Richard Gorham Nickerson and James Francis Megee

It is certified that error appears in the above-identified patent and that said Letters Patent are hereby corrected as shown below:

Assignee: Borden, Inc.

Delete at Col. 3 Line 16 "form" insert --from--

Delete at Col. 4 Line 7 "This" insert --These--

Delete at Col. 6 Line 61 "examples" insert --example--

At Col. 6 Line 67 insert after the word "reactor" a period (reactor.)

Delete at Col. 8 Line 2 "porcedure" insert --procedure--

Signed and sealed this 2nd day of July 1974.

(SEAL)
Attest:

EDWARD M. FLETCHER, JR.
Attesting Officer

C. MARSHALL DANN
Commissioner of Patents